US011200650B1

(12) United States Patent
Ben Zadok et al.

(10) Patent No.: US 11,200,650 B1
(45) Date of Patent: Dec. 14, 2021

(54) DYNAMIC IMAGE RE-TIMING

(71) Applicant: Apple Inc., Cupertino, CA (US)

(72) Inventors: Nir Ben Zadok, Holon (IL); Oz Barak, Tel Aviv (IL); Inna Stainvas, Modiin-Maccabim-Reut (IL); Moshe Laifenfeld, Haifa (IL); Andrei Kolin, Herzliya (IL)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 16/578,991

(22) Filed: Sep. 23, 2019

Related U.S. Application Data

(60) Provisional application No. 62/736,866, filed on Sep. 26, 2018.

(51) Int. Cl.
| | | |
|---|---|---|
| *G06T 5/50* | (2006.01) | |
| *G06K 9/62* | (2006.01) | |
| *G06F 16/583* | (2019.01) | |
| *G06F 16/55* | (2019.01) | |
| *G06N 3/04* | (2006.01) | |
| *G06K 9/00* | (2006.01) | |

(52) U.S. Cl.
CPC .............. *G06T 5/50* (2013.01); *G06F 16/55* (2019.01); *G06F 16/5854* (2019.01); *G06K 9/00624* (2013.01); *G06K 9/6231* (2013.01); *G06N 3/04* (2013.01)

(58) Field of Classification Search
CPC ....... G06T 5/50; G06F 16/5854; G06F 16/55; G06K 9/00624; G06K 9/6231; G06N 3/04
USPC ........................................................ 382/275
See application file for complete search history.

(56) References Cited

U.S. PATENT DOCUMENTS

| | | |
|---|---|---|
| 8,971,640 B1 | 3/2015 | Mierle |
| 9,292,911 B2 | 3/2016 | Paris |
| 9,471,986 B2 | 10/2016 | Janky |
| 9,594,977 B2 | 3/2017 | Lin |

(Continued)

OTHER PUBLICATIONS

T. Ito, A. Shimada, H. Nagahara and R. Taniguchi, "''Clickable real world'' information retrieval application based on geo-visual clustering," The 19th Korea-Japan Joint Workshop on Frontiers of Computer Vision, 2013, pp. 22-25, doi: 10.1109/FCV.2013.6485453. (Year: 2013).*

(Continued)

*Primary Examiner* — Nay A Maung
*Assistant Examiner* — Daniella M. DiGuglielmo
(74) *Attorney, Agent, or Firm* — Blank Rome LLP

(57) ABSTRACT

Techniques for the modification of at least part of a target image (e.g., scene objects within the target image), e.g., to make the target image appear that it was captured at a different time (e.g., a different time of day, different time of year) are disclosed. This "dynamic re-timing" of the target image may be achieved by finding one or more source images including the same (or similar) scene depicted in the target image (but, e.g., captured at different times), extracting stylistic elements from the source image(s), and then modifying at least part of the target image in a realistic fashion (e.g., not altering the geometry of objects in the target image), based on one or more extracted stylistic elements from the source image(s). Three-dimensional modeling of scene objects may allow a more realistic-looking transfer of the extracted stylistic elements onto scene objects in the target image to be achieved.

20 Claims, 8 Drawing Sheets

(56) References Cited

U.S. PATENT DOCUMENTS

| | | | | |
|---|---|---|---|---|
| 2015/0170368 | A1* | 6/2015 | Janky | G06K 9/00 |
| | | | | 382/103 |
| 2016/0364625 | A1* | 12/2016 | Lin | G06T 7/90 |
| 2018/0082407 | A1* | 3/2018 | Rymkowski | G06T 11/60 |
| 2018/0350030 | A1* | 12/2018 | Simons | G06T 3/0068 |
| 2018/0357800 | A1* | 12/2018 | Oxholm | G06N 3/084 |

OTHER PUBLICATIONS

Liu, et al., "AutoStyle: Automatic Style Transfer from Image Collections to Users' Images," Eurographics Symposium on Rendering 2014, vol. 33 (2014), No. 4.

Luan, et al., "Deep Photo Style Transfer," Computer Vision and Pattern Recognition, arXiv:1703.07511v3 [cs.CV], Apr. 11, 2017.

Oliva, Aude and Antonio Torralba, "Modeling the Shape of the Scene: A Holistic Representation of the Spatial Envelope," International Journal of Computer Vision 42(3), 2001.

Oliva, Aude, "A scene-centered representation of gist," VSS 2007 Symposium: Natural Scene Understanding Statistics, Recognition, and Representation.

Shih, et al., "Style Transfer for Headshot Portraits," ACM Transactions on Graphics (TOG), vol. 33, Issue 4, Jul. 2014.

Wu, et al., "Learning Scene Gist with Convolutional Neural Networks to Improve Object Recognition," 52nd Annual Conference on Information Sciences and Systems (CISS), Mar. 2018.

Yan, et al., "Automatic Photo Adjustment Using Deep Neural Networks," ACM Transcations on Graphics, May 16, 2015.

\* cited by examiner

— 1 —

DYNAMIC IMAGE RE-TIMING

TECHNICAL FIELD

This disclosure relates generally to the fields of digital image processing, computational photography, and computer vision. More particularly, but not by way of limitation, it relates to techniques for applying stylistic elements extracted from a source image onto at least part of a target image.

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch-sensitive screens, and wireless communications abilities. The wide proliferation of these integrated devices provides opportunities to use the devices' capabilities to perform tasks that would otherwise require dedicated hardware and software. For example, as noted above, integrated devices such as smartphones and tablets typically have two or more embedded cameras. These cameras generally include lenses and camera hardware modules that may be controlled through a general purpose computer using firmware and/or software (e.g., "Apps") and a user interface, e.g., including a touchscreen interface and/or touchless control, such as voice control.

The integration of cameras into communication devices such as smartphones and tablets has enabled people to share images and videos in ways never before possible. It is now very popular to acquire and immediately share images and/or videos with other people by either sending the photos via instant message, by SMS, by email, through Apps, or by uploading the photos to an online portal, such as a social networking site or a photo sharing site. Users may also desire to apply one or more corrective or artistic filters to their images and/or videos before sharing them with other users or posting them to online portals. Some such filters may modify the images in a content-independent fashion, e.g., a vignetting effect that darkens the outer borders of the image. Other filters may perform one or more color or brightness mapping techniques to improve the appearance of the image, e.g., to increase saturation in the image. Still other filters may manipulate each pixel in a programmatically-defined fashion to create a particular effect, e.g., a sepia-toned image effect or a black and white effect.

However, more and more, users desire the ability to apply more complex artistic or "stylized" effects to their captured images and/or video. Such effects may not simply perform a mathematical modification of each pixel value in the image to generate an output image, but instead may use artificial intelligence (AI), machine learning, and/or advanced neural networks (NN) in particular to modify pixels in a context-aware fashion to imbue the essence of a particular 'style' represented in a source image to captured images and/or video.

One such approach for applying artistic styles to images has been proposed in Gatys et al., "A Neural Algorithm of Artistic Style," arXiv:1508.06576v2 [cs.cV], 2 Sep. 2015 (which paper is hereby incorporated by reference and referred to hereinafter as, "Gatys,") and provides a Deep Neural Network (DNN)-based algorithm to separate and recombine the content and style of arbitrary images to synthesize artistic versions of captured "target images," i.e., based on the style of a selected "source image." However, the algorithm proposed in Gatys extracts style representations from arbitrary source images (e.g., paintings by van Gogh or Picasso) and then applies the extracted style representations to an entire target image, e.g., based on a user's selection of the particular source image to use for a given style transfer. In other words, the choice of the source image is independent of (and often unrelated to) the content of the target image to which the source image's style will be applied.

Due to the increasing capabilities of portable integrated computing devices to have access to larger and larger image database collections (e.g., via onboard memory or via access to one or more remote image servers), combined with the increased accuracy and richness of metadata tagging, as well as semantic scene/object classification, it may be desirable to identify and utilize one or more source images having a similar scene, e.g., images that have at least one scene object (or similar scene object) in common with a captured target image or images that are taken at a similar location and/or of the same or similar subject matter, as the source image for a stylistic transfer to the target image. Doing so may provide users with new abilities to stylize captured target images in interesting and artistic ways.

SUMMARY

Systems, methods, and computer-readable media are disclosed herein for the modification of a target image, e.g., via the modification of one or more scene objects in the target image, to make the target image appear as if it were captured at a different time than the source image (e.g., a different time of day, different time of year, different season, etc.). This "dynamic re-timing" of the target image may be achieved by finding source images including the same or similar scene that is depicted in the target image (but, e.g., captured at different times), extracting stylistic elements from the representation of the scene depicted in the source images, and then modifying the scene depicted in the target image in a realistic fashion, based on the extracted style of the source image. In some embodiments, scene objects within the scene depicted in the target image may also be three-dimensionally modeled before the application of the extracted style of the source image, so as to enable and simplify the creation of a more realistic-looking transfer of the extracted style onto the scene objects (and/or their surroundings) in the scene depicted in the target image.

As mentioned above, various non-transitory program storage device embodiments are disclosed herein. Such program storage devices are readable by one or more processors. Instructions may be stored on the program storage devices for causing the one or more processors to: obtain a first image (e.g., a target image) of a first scene at a first capture time; obtain location information related to the first image (e.g., via the first image's metadata and/or user annotations related to the first image); compare the first image to a first plurality of images stored in an image database, wherein each of the first plurality of images is associated with location information and a capture time; and identify a first subset of images from the first plurality of images based, at least in part, on the respective location information of the first subset of images. (In some embodiments, the first subset of images may comprise a plurality of potential "source images.")

From the identified first subset of images, the one or more processors may be caused to select a second image (i.e., the selected second image that may serve as the source image for the style transfer process) based, at least in part, on the second image's associated location information, wherein the second image depicts at least a part of the first scene, and wherein the capture time of the second image is different than the first capture time. In some embodiments, the capture time of the second image may have been captured during at least one of the following: a different time of day than the first image; a different time of year than the first image; and a different season than the first image. Next, at least a first structural element and at least a first stylistic element characterizing the second image are identified. In some embodiments, the determination of the presence of a common scene object with the first image may also aid in the identification of the first subset of images.

Next, the one or more processors may be caused to extract the at least first stylistic element from the second image, wherein the at least first stylistic element from the second image is based, at least in part, on the capture time of the second image. Finally, the one or more processors may be caused to apply the extracted at least first stylistic element to at least part of the first image (e.g., to one or more scene objects within the first image) to create a stylized (e.g., re-timed) version of the first image, and then store the stylized version of the first image in a memory.

In some embodiments, the stylistic elements may be stored as a plurality of layers in a neural network, e.g., wherein each layer in the neural network encodes some information about the style of the source image.

Other embodiments of non-transitory program storage devices are also disclosed. In one such embodiment, a third image from the first subset of images may be selected, and stylistic elements from the third image may also be applied to a part of the first image. In this way, two different parts of the first image (e.g., two distinct scene objects in the first scene depicted in the first image) may be dynamically re-timed in two different ways, e.g., based on the use of two different source images.

In still other embodiments, applying the extracted at least first stylistic element to at least part of the first image may further comprise generating a first three-dimensional model of a first scene object that is present in each of the first image and the second image and/or generating a second three-dimensional model of the first scene object based on one or more images from the first subset of images, and then applying the extracted at least first stylistic element to the first scene object in the first image based, at least in part, on the first and/or second generated three-dimensional models of the first scene object. Three-dimensional modeling of the scene objects may, e.g., help account for changes in point of view (POV), size, shadows, etc., between the representation of the scene object in the first image and the representation of the scene object in the one or more images from the first subset of images during the application of the stylistic elements to the first scene object in the first image.

In some embodiments, the stylistic element application process may be configured to penalize alterations to structural elements within the first image, such that the application of the stylistic element is guided towards not altering the structure of the first scene depicted in the first image (e.g., the edges, borders, shapes, boundaries, etc.) in the stylized version of the first image to an undesirable degree, and instead is guided towards modifying only the stylistic elements of the first image (e.g., the hue, colorfulness, saturation, lightness, and brightness, etc.) in a realistic fashion, as will be described in greater detail below.

Various methods of creating stylized images are also disclosed herein, in accordance with the program storage device embodiments enumerated above. Various programmable electronic devices are also disclosed herein, in accordance with the program storage device embodiments enumerated above. Such electronic devices may include one or more optical sensors/camera units; a display; a user interface; a programmable control device; and a memory coupled to the programmable control device. Instructions may be stored in the memory, the instructions causing the programmable control device to execute instructions in accordance with the various program storage device embodiments enumerated above.

DETAILED DESCRIPTION

Figure 1:
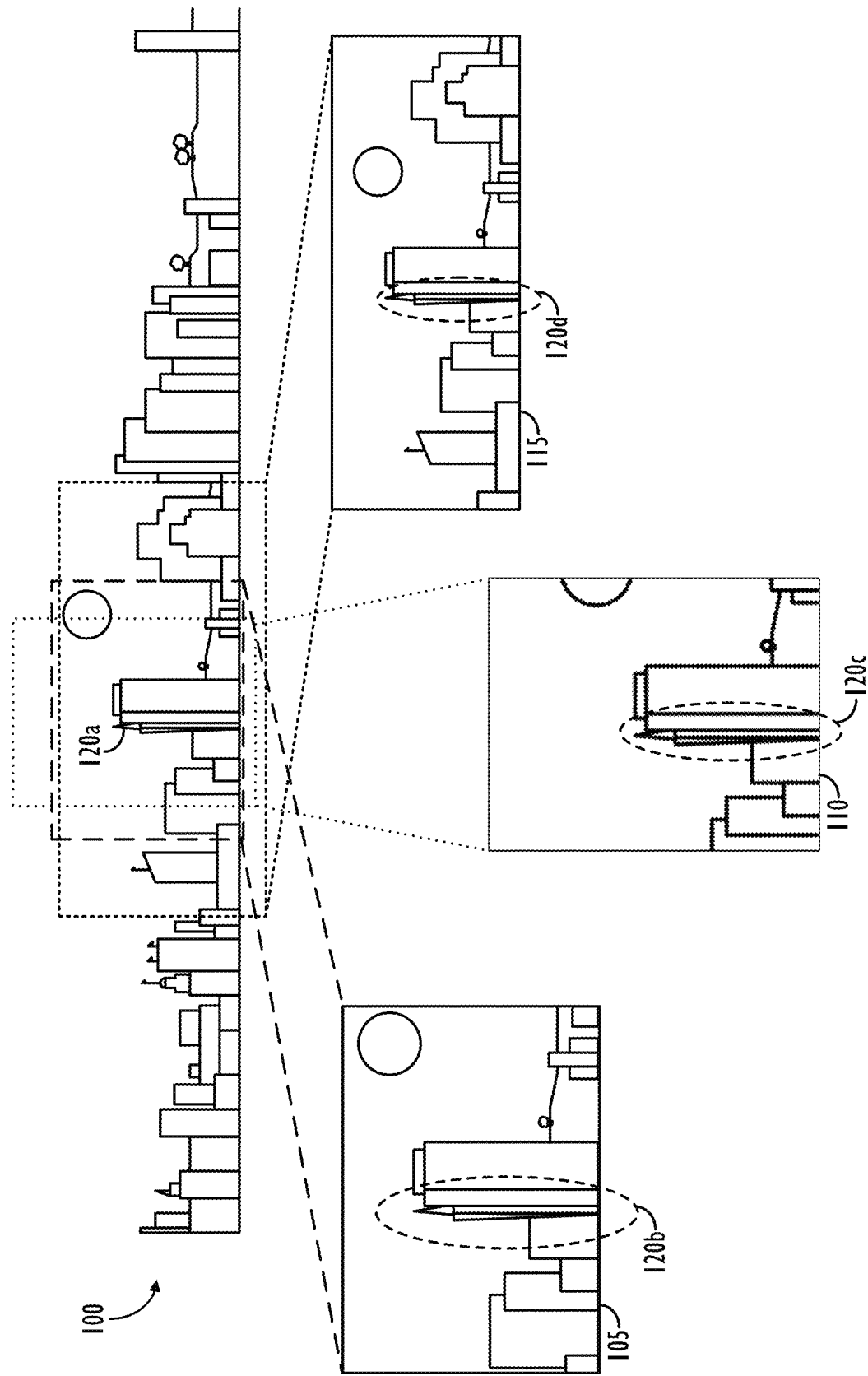
FIG. 1 is an example of multiple images captured of a common scene.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

As explained in Gatys, one class of DNN that is especially powerful in image processing tasks is known as Convolutional Neural Networks (CNNs). Convolutional Neural Networks consist of layers of small computational units that process visual information in a hierarchical fashion, e.g., often represented in the form of "layers." The output of a given layer consists of "feature maps," i.e., differently-filtered versions of the input image. The information each layer contains about the input image can be directly visualized by reconstructing the image only from the feature maps in that layer. Higher layers in the network capture the high-level "content" in terms of objects and their arrangement in the input image but do not constrain the exact pixel values of the reconstruction. To obtain a representation of the "style" of an input image, Gatys proposes using a feature space that is built on top of the filter responses in multiple layers of the network and that consists of the correlations between the different filter responses over the spatial extent of the feature maps.

Because the representations of the content and the style of an image may be independently separated via the use of the CNN, both representations may also be manipulated independently to produce new and interesting (and perceptually meaningful) images. For example, as is explained in further detail below, new "stylized" versions of images may be synthesized by generating an image that simultaneously matches the content representation of the captured image (i.e., the target image) and the style representation of the image, painting, photograph, or other work of art that serves as the source style inspiration (i.e., the source image). Effectively, this synthesizes a new version of the target image in the style of the source image, such that the appearance of the synthesized target image resembles the essence of the source image stylistically, even though it shows generally the same content as the captured target image. In some embodiments described herein, similar techniques to separate the content and stylistic components of an image may be applied in novel ways to dynamically stylize (e.g., re-time) one or more parts of a target image in a realistic fashion.

Referring now to FIG. 1, an example of multiple images captured of a common scene is shown. In this example, the scene 100 comprises the skyline of a city, e.g., San Francisco, Calif. Although, of course, the captured scene could comprise any desired scene. In this example, a common scene object 120, namely, the Transamerica Pyramid, has been identified. Scene object 120 is represented in scene 100 as object 120a.

As may be understood, images captured of the same (or similar) scene may have a single identifiable scene object in common (e.g., a particular building or other landmark), multiple identifiable scene objects in common, or no identifiable scene objects in common. In instances in which common scene objects have been identified between two images, each such common scene object does not have to be individually identified and matched in order to determine that two images are of the same (or similar) scene. Instead, one or more scene similarity scoring heuristics, e.g., based on location, geo-orientation, altitude, image similarity, and/or number of same or similar scene objects in common, may be taken into account when determining the scene similarity score between two different images. In some embodiments, if the scene similarity score between two particular images exceeds a minimum threshold similarity value, the two images may be deemed to be of the same scene, for the purposes of this application.

According to embodiments disclosed herein, the location of the captured or obtained first image must be at least within a distance similarity threshold of the associated location of any matching images from a searched image database collection. For example, if two images merely depict "beach" scenes, e.g., one image of a beach in Hawaii and one image of a beach in Florida, they may score fairly highly in terms of an image similarity heuristic (same class of scene, similar colors, presence of sky, waves, etc.), but would score very lowly in terms of location, geo-orientation, scene objects in common, etc. Further, the locations of the two images would not likely fall within the required threshold distance of one another. Thus, the image of the beach in Florida would not be deemed to depict the same scene as the image of the beach in Hawaii. Likewise, two images taken on the same beach in Hawaii, e.g., one facing the ocean and one facing the shore, may fall within the required threshold distance of one another, but otherwise score so lowly in terms of geo-orientation, image similarity, scene objects in common, etc., that they also would not be deemed to depict the same scene—even though the images were taken at the same (or almost the same) place on Earth. By contrast, two images taken on the same beach in Hawaii, each facing the ocean in the same direction, would be more likely to be deemed to depict the same scene, assuming their scene similarity score exceeded the minimum threshold similarity value, e.g., based on their respective location, geo-orientation, scene objects in common, etc.

Returning now to FIG. 1, multiple other images (105, 110, and 115) have also been taken of scene 100 with different dimensions, zoom levels, fields of view, etc., but within a threshold distance of one another. In this example, images 105, 110, and 115 have each likewise captured their own representations of common scene object 120, labeled as 120b, 120c, and 120d, respectively. The images 105, 110, and 115 may all have been taken by different users, or may each have been taken by the same user. However, in this example, each of images 105, 110, and 115 were also captured within a threshold amount of time from one another, e.g., during the same minute, the same hour, the same span of hours, the same morning, the same month, same relative time within a year (e.g., in the middle of May, but in three different years), same season, same holiday, same event (e.g., city-wide celebration), etc. As will be described in greater detail below, a set of images of the same scene that are taken within a threshold amount of time from one another (such as the images shown in FIG. 1) may not be good candidates for re-timing each other (despite depicting the same scene), because they may not exhibit a noticeable amount of stylistic differences amongst themselves, so as to be able to impart a noticeable re-timed stylization to another image within the set.

As mentioned above, modern portable integrated computing devices often have the ability to tag captured images with large amounts of metadata, e.g., location, geo-orientation (i.e., the compass direction the device was facing when an image was captured), timestamp, altitude, weather, camera model, resolution, color information, data captured by an inertial measurement unit (IMU), user annotations, etc. Having access to an image database with images tagged with such metadata information may allow the device to quickly search for and return images taken at certain places on Earth, during certain time ranges, at certain areas of interest, etc. Captured images may further be tagged with semantic scene/object classification data as well. For example, in some embodiments, images 105, 110, and 115 may be tagged with scene or object classifiers, such as "downtown," "San Francisco," "Transamerica Pyramid," "daytime," "buildings," "architecture," "skyline," "sunrise," "buildings," "trees," etc. Having access to an image database with images tagged with such information may allow the device to quickly search for and return images having particular landmarks or types of objects in them, or images of certain scenes.

Figure 2:
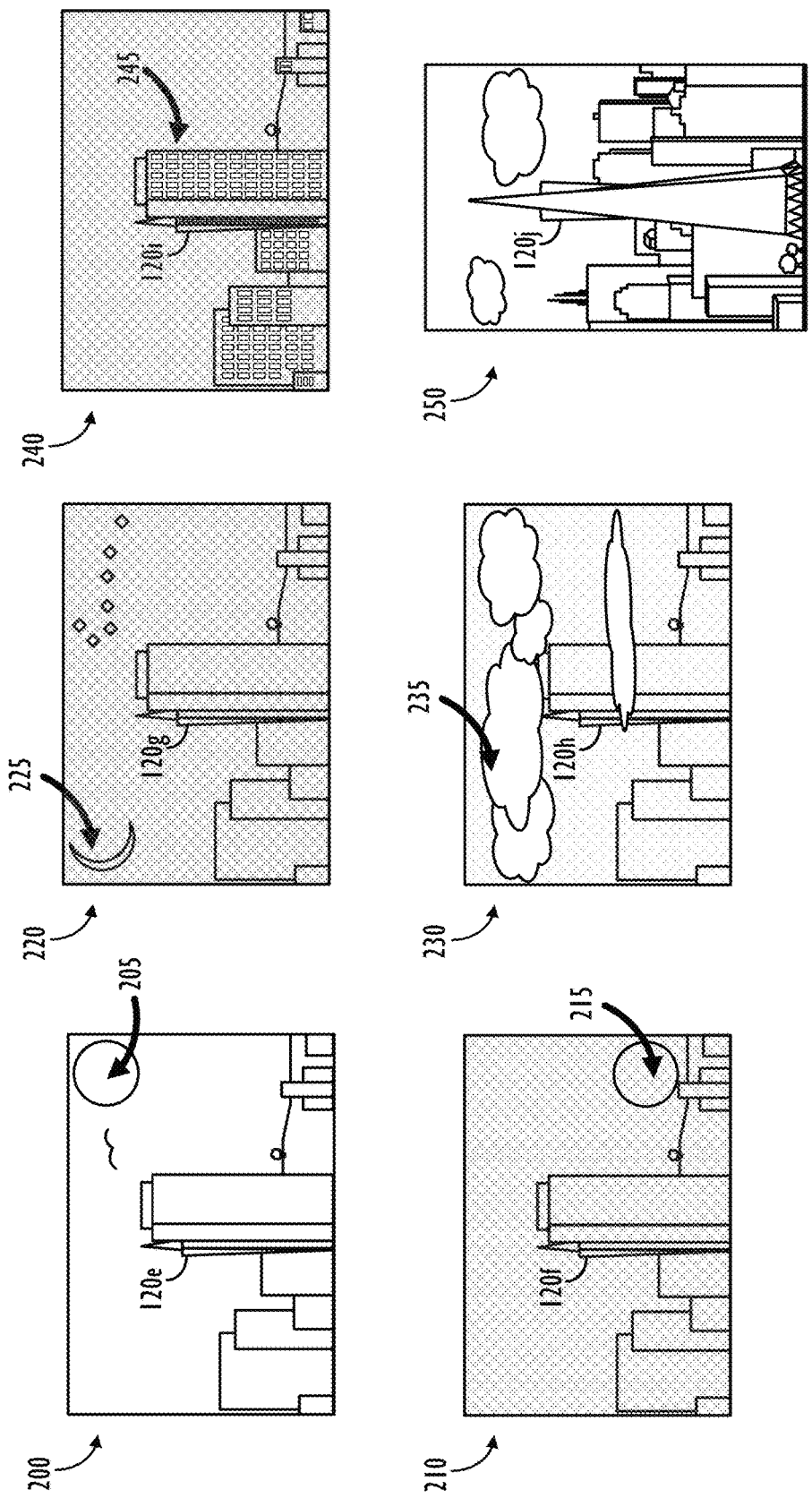
FIG. 2 is an example of multiple images of a common scene captured at different times, according to one or more embodiments.

Referring now to FIG. 2, an example of multiple images of a common scene captured at different times is shown, according to one or more embodiments. In this example, the scene again comprises the skyline of San Francisco, Calif., and each image again comprises a representation of common scene object 120, i.e., the Transamerica Pyramid (labeled as 120e-120j, in images 200, 210, 220, 230, 240, and 250, respectively). However, as opposed to FIG. 1, wherein each of images 105, 110, and 115 were captured within a threshold amount of time from one another, the exemplary images 200, 210, 220, 230, 240, and 250 were each captured at different times from one another (e.g., different times of day, different times of year, different seasons, different holidays, different events, etc.).

In particular: image 200 appears to have been captured close to midday on a sunny day (see, e.g., position of sun 205); image 210 appears to have been captured closer to sunset (see, e.g., position of sun 215); image 220 appears to have been captured at nighttime (see, e.g., appearance of moon 225); image 230 appears to have been captured during a cloudy day (see, e.g., appearance of clouds 235); image 240 appears to have been captured at a time of year when various windows on buildings are illuminated in a particular manner, such as being uniformly lit in a particular color (see, e.g., appearance of windows 245, indicating the appearance of windows illuminated in a particular manner); and image 250 appears to have been captured at daytime, but at a different location than images 200, 210, 220, 230, or 240—although still capturing a representation of the same scene, i.e., the skyline of San Francisco, and including common scene object 120 (see, e.g., the larger appearance of Transamerica Pyramid 120j in image 250, as compared to representations 120e-120i). As will be explained in greater detail below, these various images (200, 210, 220, 230, 240, and 250) of the same (or similar) scene captured across different times and with different lighting/weather/seasonal conditions may be helpful in the later dynamic re-timing of images captured of the same (or similar) scene at some other time.

Figure 3:
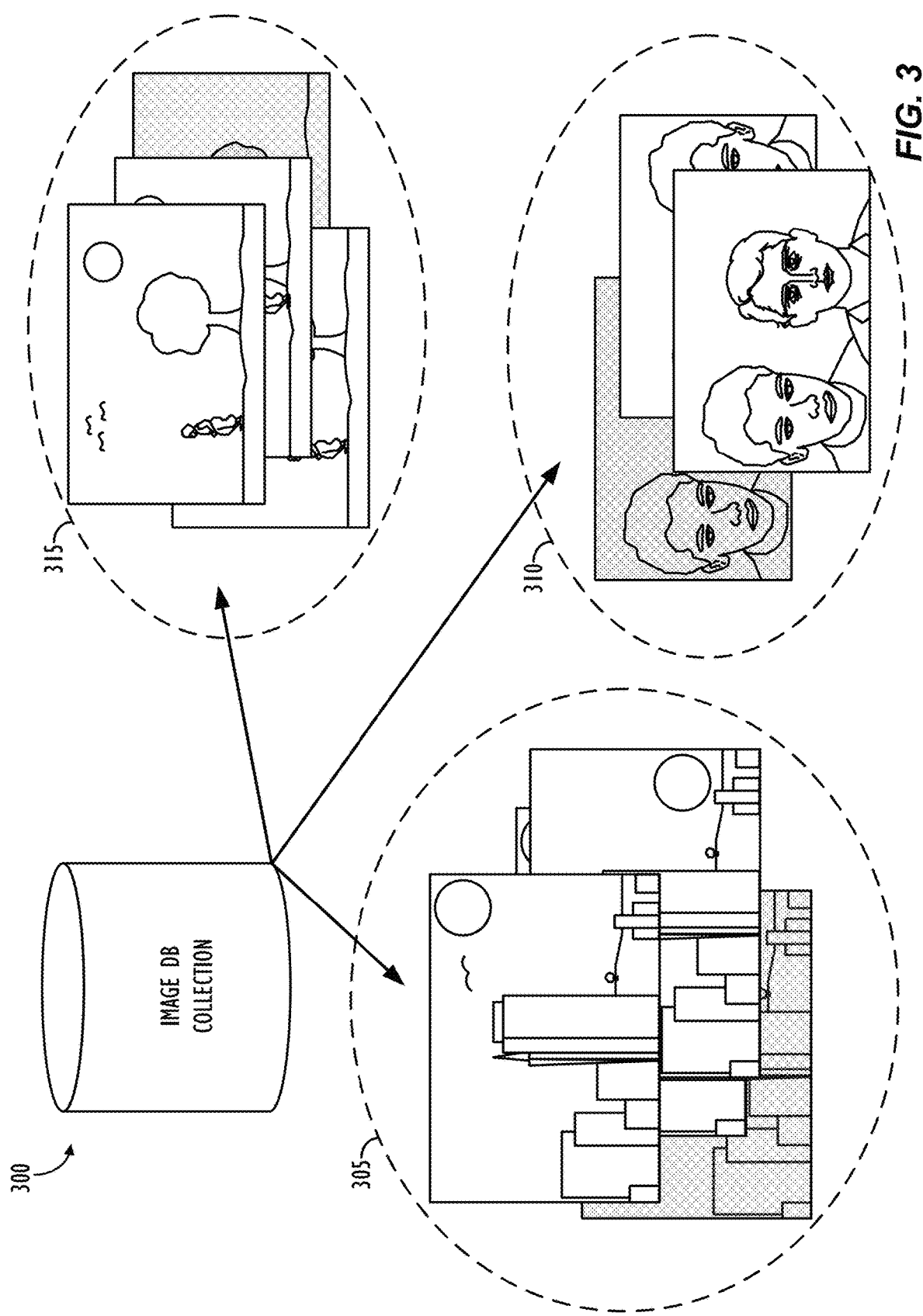
FIG. 3 is an example of an image database collection having one or more clusters of images, according to one or more embodiments.

Referring now to FIG. 3, an example of an image database collection 300 having one or more clusters of images is shown, according to one or more embodiments. In this example, three distinct clusters of images are shown: San Francisco skyline cluster 305; friend portraits 310; and jogging photos 315. In this example, the various images within each cluster have been grouped together based on their mutual similarity, e.g., based on their image similarity (e.g., similar color histograms, saturation, average brightness, etc.), semantic or scene similarity (e.g., tagged as being taken at the same or similar location and/or geo-orientation, determined to include a similar scene object, tagged with similar people appearing in the images, taken at a similar date and/or time, tagged as being the same scene or type of scene, etc.), and/or machine learning approaches (e.g., use of DNNs to identify objects in the scene and their relative arrangements in order to define a 'gist' or 'type' of the scene). Likewise, images that are in different clusters than each other may have been adjudged by the system to have more than a threshold amount of differences between them. As may be appreciated, different implementations may use different parameters, different methodologies, or may set different thresholds for determining whether two or more images should be grouped together into a cluster. Moreover, in a given image database collection, there may be one or more 'singleton' images that do not show enough similarity to be clustered with any other images in the database collection.

Figure 4:
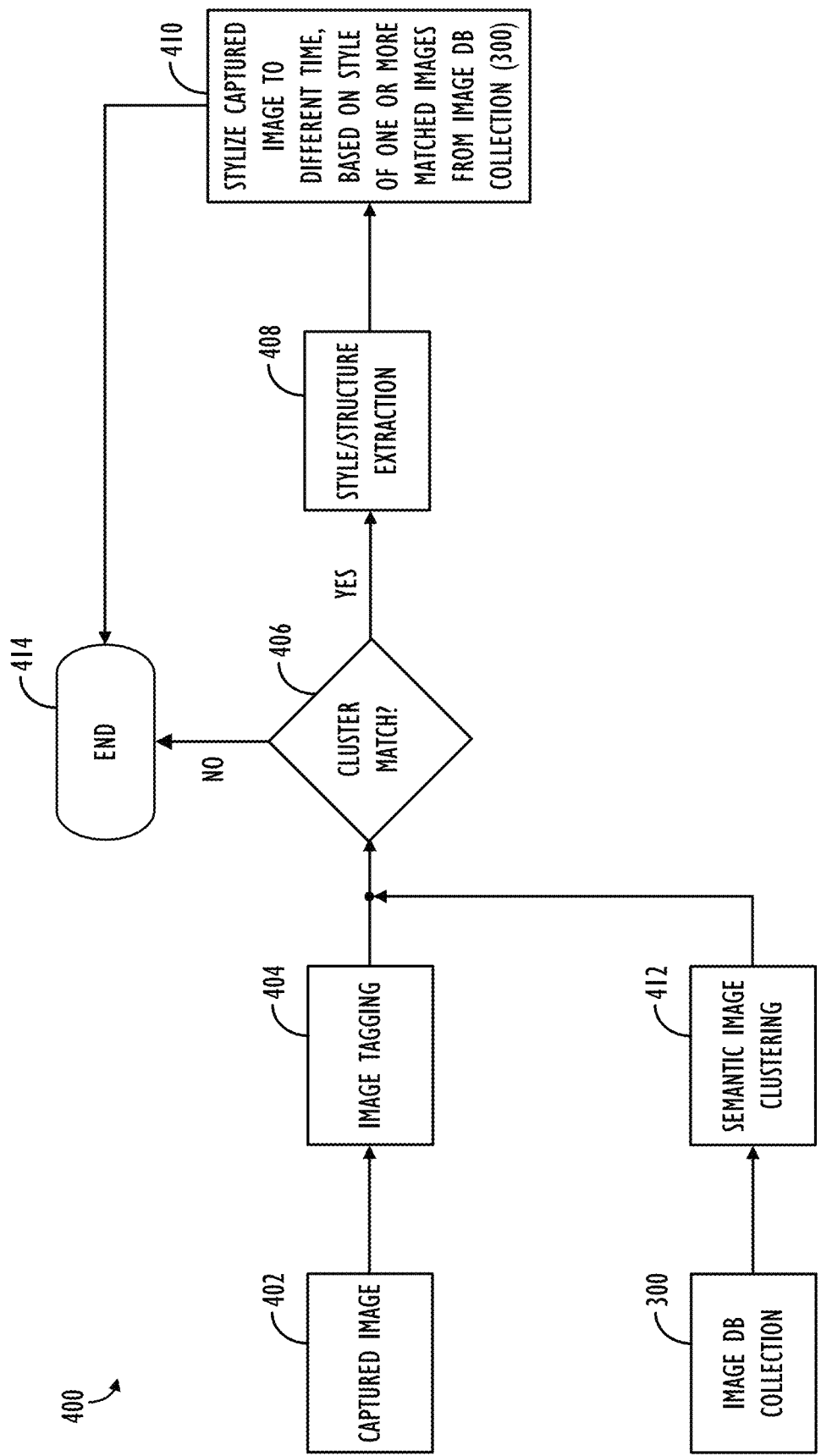
FIG. 4 is a block diagram illustrating a process for performing a stylized re-timing of a target image, according to one or more embodiments.

Referring now to FIG. 4, a block diagram 400 illustrating a process for performing a stylized re-timing of a target image is shown, according to one or more embodiments. First, a captured image may be obtained, e.g., by a portable computing device (Block 402). The captured image may be of a first scene, captured at a first time. At Block 404, the image may be tagged with any desired metadata. As described above, captured images may be tagged with various types of metadata, e.g., location, geo-orientation, timestamp, altitude, weather, camera model, resolution, color information, user annotation, etc. Alternatively, or additionally, captured images may be tagged with semantic scene/object classification metadata as well, e.g., landmarks, regions of interest, points of interest, areas of interest, scenes, types of scenes, holidays, events, trips, scene objects, emotions expressed in the image, faces appearing in the image, people appearing in the image, etc. As discussed above with reference to FIG. 3, an image database collection 300 may also be grouped into semantic clusters (Block 412), e.g., based on the similarity of their metadata and/or content. According to some embodiments, the clustering process of Block 412 may be performed 'offline,' that is, prior to the time of image capture at Block 402. In such embodiments, the clustering of the image database collection may constantly be refined and/or improved, e.g., as new images are added to the collection over time, images are removed from the collection over time, and/or new metadata information is received or generated regarding the images in the collection. It should be noted that the processing to perform the image clustering may be performed at the portable computing device itself, or may be performed by, or in conjunction with, one or more remote servers in communication with portable computing device and having access to the image database collection (or at least the relevant metadata from the image database collection). In other embodiments, as opposed to being performed 'offline,' the image clustering of Block 412 may be done as needed, e.g., in response to a request from a user to stylize a captured image.

At Block 406, the process may determine if the captured image 402 matches any of the created image clusters from Block 412. As discussed above, in some embodiments, identifying the relevant matching clusters may involve the use of a scene similarity score and a minimum threshold similarity value. For example, if a given cluster of images from the database collection all include a particular object (e.g., the Transamerica Pyramid), then the incoming captured image 402 may only match with the given cluster with greater than the minimum threshold similarity value if it likewise contains a representation of the Transamerica Pyramid. As another example, if a given cluster of images were all captured within 20 miles of Boise, Id., then the incoming captured image 402 may only match with the given cluster with greater than the minimum threshold similarity value if it likewise was captured within 20 miles of Boise, Id. As a final example, if a given cluster of images were all captured at the intersection of Main Street and Third Street, facing east, then the incoming captured image 402 may only match with the given cluster with greater than the minimum threshold similarity value if it likewise was captured at the intersection of Main Street and Third Street, facing east (or any other particular desired orientation). According to some such embodiments, time will not be taken into consideration in the cluster matching of Block 406, as it may be beneficial to match the incoming image with images having similar content, even if captured at different times of day/month/ year, etc., such that the style of the matching images may later be extracted to dynamically re-time the incoming image, as will be described in further detail herein. If, at Block 406, a cluster matching exceeding the minimum threshold similarity value is not found (e.g., no cluster from the database collection exceeds the minimum threshold similarity value with the captured image, or no matching cluster includes a threshold minimum number of images, etc.), the process may end at Block 414.

If, instead, at Block 406, a cluster match is found, the process may continue at Block 408 to perform a style extraction operation on one or more of the images from the identified image cluster. In some embodiments, the style of the one or more matching images (e.g., the 'sunniness' of such images) may be separated from the structure of the one or more matching images (e.g., the one or more buildings present in such images), e.g., using a neural network-based approach, as discussed above. In some embodiments, the stylistic elements may be stored as a plurality of layers in a neural network, e.g., wherein each layer in the neural network encodes some information about the style of the image from which it has been extracted. According to some embodiments, the neural network may be configured such that the stylistic elements extracted from the source image (e.g., an image in the identified matching cluster) may pertain to a particular scene object(s) of interest (as opposed to the entire source image itself) and may be applied to the same scene object(s) in the target image (e.g., the captured image). For example, a style extracted from the Transamerica Pyramid appearing in one source image may advantageously be applied to a representation of the Transamerica Pyramid appearing in a target image (as opposed to being applied to different buildings and/or the skyline of different city). Moreover, the neural network may be configured to transfer the extracted stylistic elements in a 'realistic' fashion, i.e., using penalty terms for network modification that would manipulate the shape or structure of the scene object of interest in the target image, as opposed to an 'artistic' fashion, i.e., in which the network is more likely to alter the underlying structure of the target image to which the style is being applied in order to impart the artistic look of the source image(s).

In some instances, e.g., to further optimize the clustering process and subsequent matching operations, the image database collection (stored locally and/or at a remote server) may contain various image features extracted from the captured images (as opposed to the entire images). In such instances, features may be extracted from captured images, e.g., by a portable computing device, and then a representation of the extracted features may be transmitted to the image database collection for comparison and/or matching to existing feature clusters in the image database collection. In this way, less information has to be transmitted to/from the image database collection to determine if there is a valid cluster match for a given captured image.

Next, at Block 410, the captured image may be stylized to appear as though it were captured at a different time, e.g., based on the stylistic elements extracted from one or more of the matched images from image database collection 300. In some embodiments, the image from the matching cluster that is the most different in time to the captured image may be suggested for use to re-time the captured image. In other embodiments, the image from the matching cluster that most closely matches a set of predefined user preferences may be used to re-time the captured image. In still other embodiments, e.g., if there are multiple closely-matching images from the matching cluster, an option may be presented to a user requesting an indication of which image the user desires to use for the stylized transfer to the captured image. In yet other embodiments, a suggestion of popular image style transfers, e.g., as measured across a network of users, may be presented to a user. Finally, once the captured image is stylized in the desired fashion, the process may end at Block 414.

Figure 5:
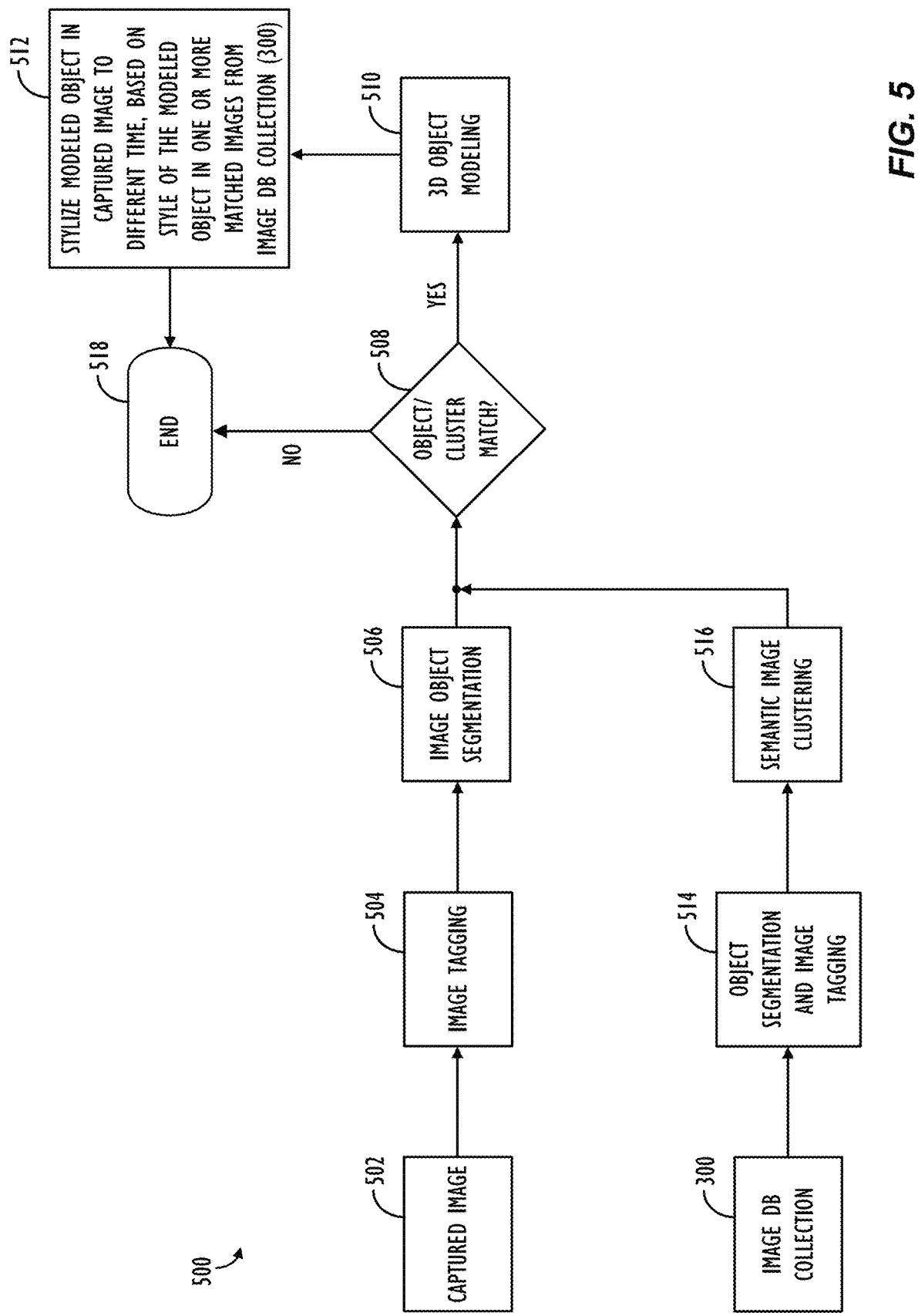
FIG. 5 is a block diagram illustrating a process for performing a stylized re-timing of a target image comprising object segmentation and three-dimensional object modeling, according to one or more embodiments.

Referring now to FIG. 5, a block diagram 500 illustrating a process for performing a stylized re-timing of a target image comprising object segmentation and three-dimensional object modeling is shown, according to one or more embodiments. First, a captured image may be obtained, e.g., by a portable computing device (Block 502). As described above with reference to Block 404 of FIG. 4, the captured image may be tagged with any desired metadata (Block 504). In this example, the image database collection 300 may be object segmented and tagged (Block 514) before being grouped into semantic clusters (Block 516), e.g., based on the similarity of their metadata and/or content.

According to some embodiments, the object segmentation and tagging process (Block 514) may comprise: applying a semantic segmentation process to segment out one or more scene objects from the rest of the captured scene (e.g., the one or more largest objects recognized in the scene, the one or more objects recognized with the largest degree of confidence, the one or more recognized objects in the best focus, the one or more most salient objects in the scene, etc.). Next, the method may perform object recognition on the one or more scene objects (e.g., using on or more object classifiers), and, optionally in conjunction with image metadata analysis, determine what objects are in each image. Then, a clustering operation at Block 516 (e.g., similar to that described above with reference to Block 412) may be applied to the images in the image database collection, in order to group the images together into clusters, e.g., based on the similarity of the objects appearing in the respective images.

As described above, according to some embodiments, the segmentation and clustering processes of Blocks 514 and 516 may be performed 'offline,' that is, prior to the time of image capture at Block 502. In other embodiments, as opposed to being performed 'offline,' the segmentation and clustering processes of Blocks 514 and 516 may be done as needed, e.g., in response to a request from a user to stylize a captured image.

At Block 506, the incoming captured image 502 may also have object segmentation performed on it, e.g., as described above with reference to the object segmentation of Block 514 that may be performed on the images from image database collection 300. Next, at Block 508, a determination may be made as to whether there is a match between at least one of the objects segmented out of the captured image 502 and an object in one of the image clusters from the image database collection at Block 516. As discussed above with reference to Block 406, various factors may be considered to determine whether or not there is an object/cluster match with the image database collection that exceeds the minimum threshold similarity value. If, at Block 508, a matching cluster is not found (e.g., no cluster from the database collection exceeds the minimum threshold similarity value with respect to the segmented object(s) from the captured image, or no matched cluster includes a threshold minimum number of images), the process may end at Block 518.

If, instead, at Block 508, a cluster match exceeding the minimum threshold similarity value is found, the process may continue at Block 510 to perform three-dimensional object modeling on at least one of the objects segmented out of the matched images from the image database collection. In some embodiments, the three-dimensional model of the segmented object(s) may be created by synthesizing images of the object(s) taken from different POVs (and/or captured using depth-sensing cameras) in the various images in the matching cluster from the image database collection. As described above, the various images may be taken at different times, as well as from different POVs, and information from gravity sensors, gyrometers, accelerometers, and/or IMUs associated with the particular image may be used to assist in three-dimensional model construction process. Once constructed, the three-dimensional model(s) can be used to connect between the appearance of the object(s) in the captured image (502) and its appearance in the images in the matching cluster from the image database collection. In some embodiments, the three-dimensional modeling of database images may be done offline to save processing time when a user requests the stylization of a captured image. In still other embodiments, three-dimensional modeling of an incoming captured image could be done by one or more remote servers in communication with portable computing device, with the resulting models being passed back to the portable computing device, if desired.

At Block 512, the representation of the modeled object in the captured image may be stylized, e.g., as described above, to appear as though it were captured at a different time, based on the stylistic elements extracted from the modeled object from the one or more images in the matching cluster from the image database collection. Through the aid of the three-dimensional model, the stylization process may better take into account the different POVs of the object in the captured image and the matching images when applying the stylization. Finally, once the captured image is stylized in the desired fashion, the process may end at Block 518.

As alluded to above, in some embodiments, different parts of the first scene, e.g., multiple scene objects in the captured image, may be stylized (e.g., re-timed) in different ways. For example, a second scene object in the captured image may be stylized based on the style of a corresponding scene object in a different image from the images in the matching cluster from the image database collection (i.e., the cluster having the image that was used to stylize the first scene object from the captured image). For example, a building in an incoming captured image may be stylized to look like it was captured at nighttime, based on a first image in a matching cluster capturing the building at a nighttime, and a tree in the incoming captured image may be stylized to look like it was captured in winter, based on a second image in the matching cluster capturing the tree in a winter month. In still other embodiments, the first scene object may be stylized based on the stylistic elements of a corresponding object extracted from an image in a first cluster from the image database, while a second scene object may be stylized based on the stylistic elements of a corresponding object extracted from an image in a second (i.e., different) cluster from the image database.

Figure 6:
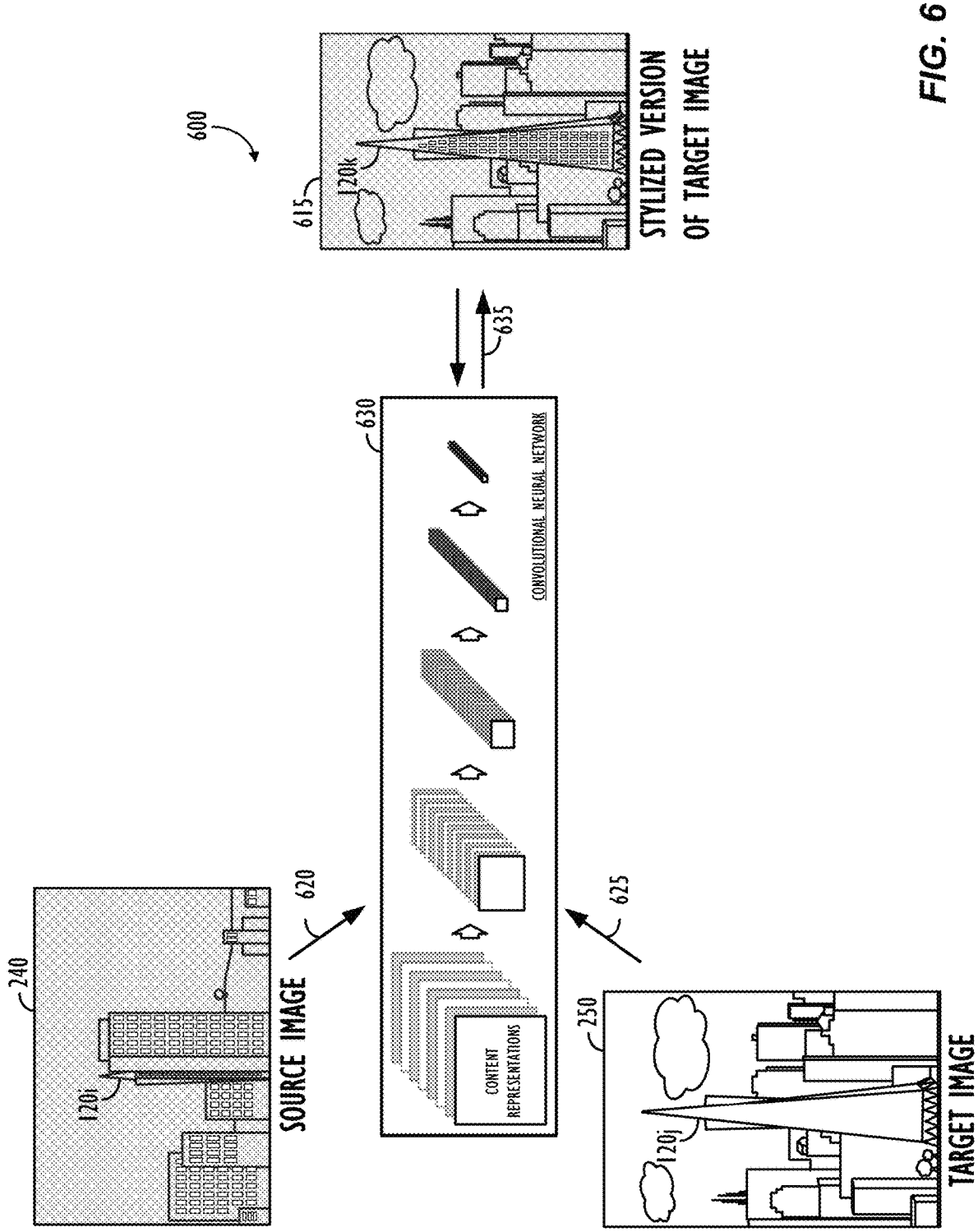
FIG. 6 is an example of an application of extracted stylistic elements to a target image using a neural network, according to one or more embodiments

Referring now to FIG. 6, an example 600 of a neural network 630, e.g., a convolutional neural network, for applying extracted stylistic elements to a target image is shown, according to one or more embodiments. In example 600, the source image 240 is the same as image 240 described above with reference to FIG. 2, and the target image 250 is the same as the image 250 described above with reference to FIG. 2. Both the source image 240 and the target image 250 in this example depict at least a part of the same scene (in this case, that of the skyline of San Francisco) and each contain a common scene object of interest, i.e., the Transamerica Pyramid 120. As shown, neural network 630 may be used to extract style representation information (620) from the source image 240 and also to extract content representation information (625) from the target image 250. In some embodiments, the extracted style representation information may come from only a desired scene object(s) of interest, i.e., as opposed to the entire scene depicted in the source image. In still other embodiments, the style representation may be extracted from two or more similar source images. Neural network 630 may then synthesize (635) various versions of a stylized target image 615. Increasing subsets of the CNN layers may be used to match the style representation of the source image in different manners. For example, the image structures that are able to be captured in the style representation may increase in size and complexity when including style features from higher layers of the neural network. The lower layers in neural network 630 may provide an almost perfect reconstruction of the input image, i.e., from a pixel and content standpoint, whereas the higher layers in neural network 630 may lose some pixel information but preserve higher level content representation from the input image.

According to some embodiments, the process of optimizing the style transfer to the target image may be carried out in a manner similar to the training of a new neural network, wherein the parameters of the network may be used to gradually alter the target image's content over multiple iterations. According to some such embodiments, the optimization process may be incentivized to maintain the high-level content representation from the input image, while imparting only the stylistic elements from the source image. In some implementations, this may be achieved by the use of a penalty term in an optimization function that penalizes alterations to the structural elements of the input target image (and/or, specifically, the relevant scene objects in the input target image to which the stylistic elements are being applied). In some embodiments, the amount of deformation between comparable shapes may be quantified using various overlap metrics (e.g., match filter, hit and miss, mutual information, correlation, etc.). One goal of such a network would be to avoid alterations to the structures in the input target image (and/or of the relevant scene objects in the input target image), e.g., such as the edges, borders, shapes, and boundaries, while only modifying the stylistic elements of input target image based on the source (e.g., the hue, colorfulness, saturation, lightness, and brightness, etc.), such that the 'essence' of the source image is imparted to the target image in a more realistic fashion, e.g., without disrupting the geometry or shape of the scene objects of interest in the target image.

For example, as shown in FIG. 6, the stylized version of the target image output by the CNN (615) has maintained the same structures (e.g., the trees, clouds, buildings, edges, lines, etc.) as in input target image 250, but overall stylistic elements extracted from the source image 240 have been imparted to stylized version of the target image 615, as indicated by the fact that image 615 has been darkened to appear that it was captured at night (as was the source image 240) rather than at day time, and elements of the particular window lighting found in the office buildings in source image 240 (e.g., including Transamerica Pyramid representation 120*i*) have been applied to the windows of the Transamerica Pyramid representation 120*k* in the stylized version of the target image 615. In this way, the target image 250 has been re-timed to appear that it was captured at a similar time as source image 240. In this example, the nighttime stylistic elements extracted from source image 240 are particularly relevant to target image 250 because (e.g., due to the use of an image database cluster matching process, such as described above), the source image 240 and target image 250 depict at least a part of the same scene. For example, source image 240 and target image 250 are captured at very close to the same location (e.g., around downtown San Francisco) and share at least one scene object in common (e.g., the Transamerica Pyramid). Thus, the stylistic elements extracted from nighttime in San Francisco in the source image 240 (and from Transamerica Pyramid representation 120*i*, in particular) may look particularly natural and/or realistic when used to re-time the look of a common scene object, located at a similar place on Earth, in target image 250 (e.g., Transamerica Pyramid representation 120*j*), i.e., as opposed to extracting the nighttime stylistic elements from some other random image of a different scene (or type of scene) or a work of art that simply happened to feature a nighttime scene (e.g., van Gogh's painting of "The Starry Night").

Figure 7:
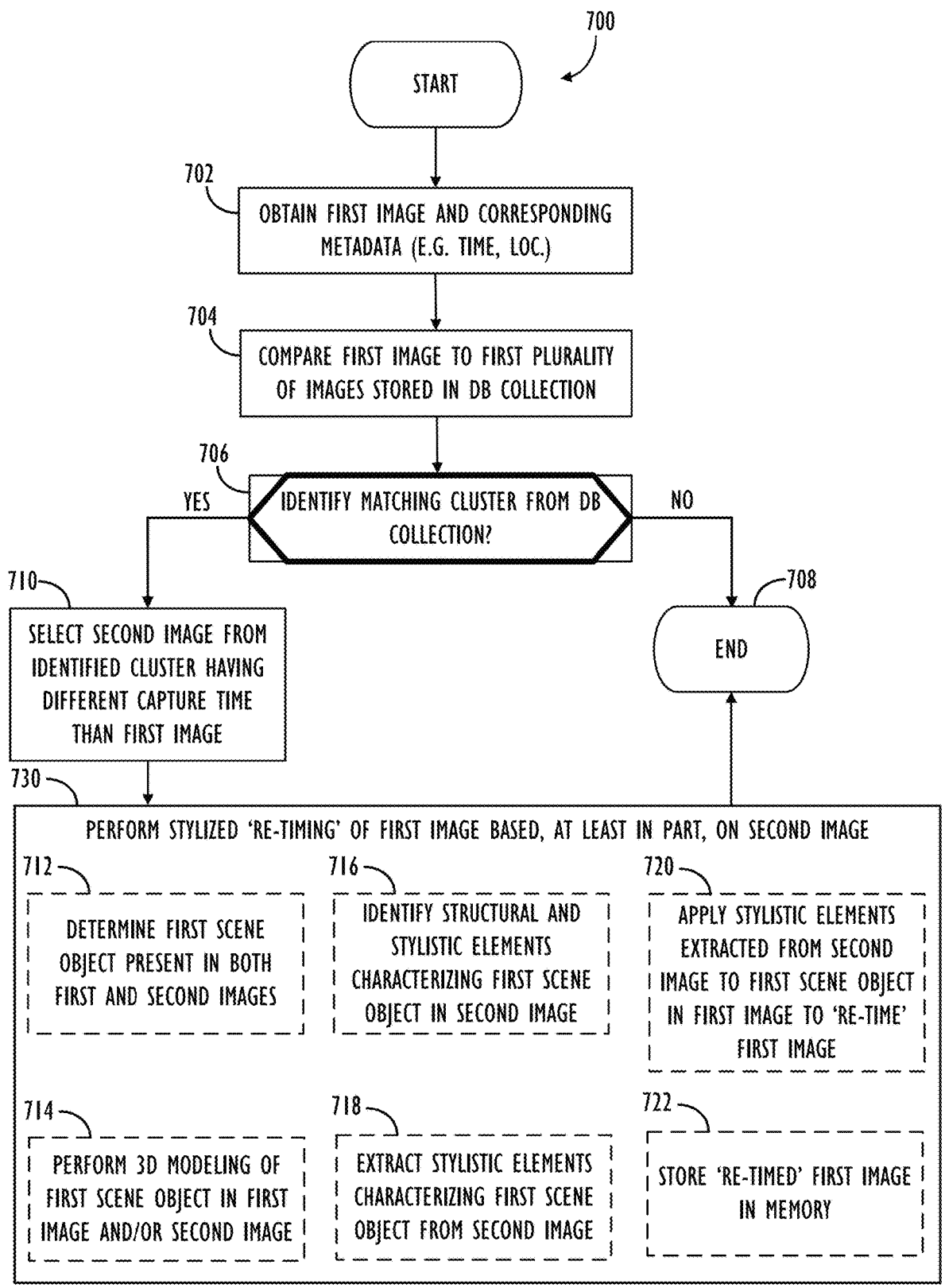
FIG. 7 is a flowchart illustrating an overall method for performing a stylized re-timing of a target image, according to one or more embodiments.

Referring now to FIG. 7, a flowchart, illustrating an overall method 700 for performing a stylized re-timing of a target image is shown in more detail, according to one or more embodiments. First, at Step 702, the method may obtain a first image and its corresponding metadata (e.g., location, geo-orientation, timestamp, altitude, weather, camera model, resolution, color information, user annotations, etc.). Next, at Step 704, the obtained first image may be compared to a first plurality of images stored in an image database collection. As discussed above, each of the images stored in an image database collection may also comprise location, time, and/or other metadata. In some such embodiments, the images from the image database collection may be clustered together by similarity. According to some embodiments, one or more thresholds may be used to determine whether a cluster matches the captured image according to one or more factors (e.g., in terms of location, geo-orientation, subject matter, scene classification, etc.)

At Step 706, if no matching cluster from the image database collection has been located (i.e., 'NO' at Step 706), the process may proceed to Step 708 and end. In some embodiments, the device may optionally display a message to a user of the portable computing device that no matching images could be found to apply a re-timing stylization to the obtained first image. If, instead, at Step 706, a matching cluster from the image database collection is located (i.e., 'YES' at Step 706), the process may proceed to Step 710 and select a second image from the identified cluster. In some embodiments, the second image may depict at least a part of the scene captured in the first image. For example, the second image may be selected based, at least in part on its location and/or time metadata, as compared to the first image. In some instances, the selected second image form the matching cluster may comprise the image taken at a location closest to the first image, or at a time most different from the first image, etc. According to some embodiments, at least one facet of the timing of the selected second image will be different than that of the time of the first image (e.g., a different time of day, different time of year, different season, different event, etc.). Next, the process may proceed to Step 730 to perform the stylized re-timing of the first image based, at least in part, on the second image.

As discussed with respect to the various Figures described herein above, the stylization process 730 may involve one or more of several elements, based on the desires of a given implementation. For example, if it is desired to apply the stylization to particular objects in the first image, then the process may proceed to Step 712 to determine a first scene object that is present in both the first and second images (e.g., via the use of scene segmentation and/or object classifiers, as discussed above). In still other embodiments, it may be desirable to create a three-dimensional model of the scene object that will be stylized, such that the stylistic elements extracted from source image capturing the scene objects at a different POV may be applied in a realistic fashion to the image being stylized. In some cases, the image capturing device may include a depth sensor or otherwise have the ability to capture and record depth information of a scene (e.g., via the use of a stereoscopic capture system), which depth information may further be utilized in the construction and use of three-dimensional models of scene objects. In still other embodiments, the image capturing device may also capture orientation information (e.g., as recorded by an IMU) to aid in the construction and use of the three-dimensional models of scene objects. Thus, at Step 714, the method may perform three-dimensional modeling of the first scene object in the first image and/or in the second image. In some embodiments, multiple images form the identified cluster may be utilized to develop a more robust three-dimensional model of the scene object of interest.

At Step 716, the process may identify at least a first structural element and at least a first stylistic element characterizing the first scene object in the second image. At Step 718, the process may proceed to extract the at least first stylistic element from the second image, wherein the at least first stylistic element from the second image is based, at least in part, on the capture time of the second image. In other words, the extracted stylistic element encapsulates something about the time of capture of the second image, e.g., the time of day (e.g., nighttime), time of year (e.g., June), season (e.g., winter), etc., that affects the appearance of the first scene object (e.g., its brightness, the quality or character of light shining on or from the object, the overall coloration, etc.).

At Step 720, the extracted at least first stylistic element may be applied to at least part of the first image (e.g., the first scene object) to create a stylized (e.g., re-timed) version of the first image. Finally, at Step 722, the stylized version of the first image in a memory, and the process may end at Step 708.

Figure 8:
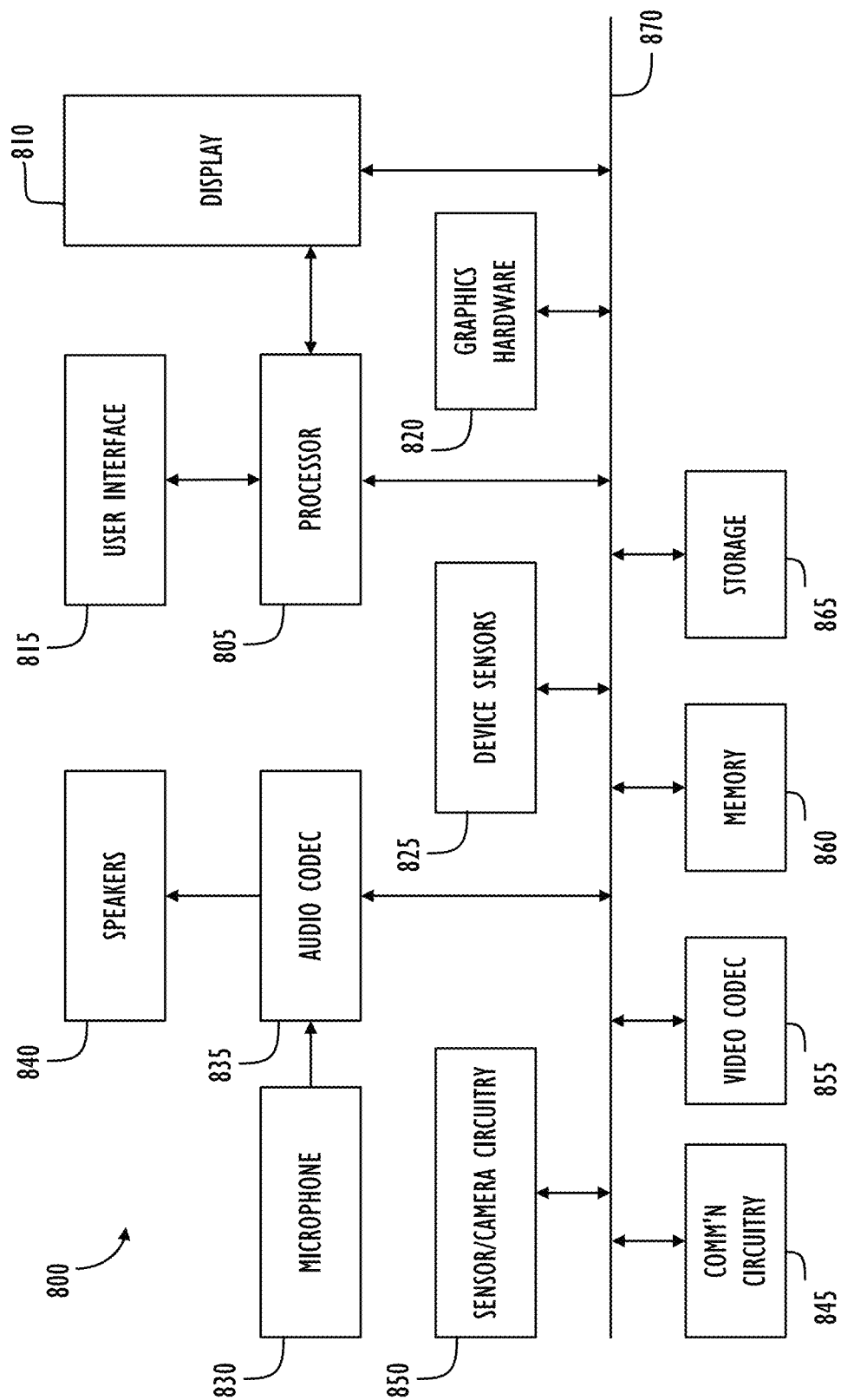
FIG. 8 is a block diagram illustrating a programmable electronic computing device, in which one or more of the techniques disclosed herein may be implemented.

Referring now to FIG. 8, a simplified functional block diagram of illustrative programmable electronic computing device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, IMU, accelerometer, and/or gyroscope), microphone 830, audio codec(s) 835, speaker(s) 840, communications circuitry 845, image capture circuit or unit 850, which may, e.g., comprise multiple camera units/optical sensors having different characteristics, video codec(s) 855, memory 860, storage 865, and communications bus 870.

Processor 805 may execute instructions necessary to carry out or control the operation of many functions performed by device 800 (e.g., such as the generation and/or processing of images in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touchscreen (e.g., a touchscreen having a slider or other UI element(s) allowing a user to specify a degree/level to which an artistic style is to be applied to a target image). User interface 815 could, for example, be the conduit through which a user may view a captured video stream and/or indicate particular frame(s) that the user would like to have a particular stylization(s) applied to (e.g., by clicking on a physical or virtual button at the moment the desired frame is being displayed on the device's display screen). In one embodiment, display 810 may display a video stream as it is captured while processor 805 and/or graphics hardware 820 and/or image capture circuitry contemporaneously generate and store the video stream in memory 860 and/or storage 865. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs). Communication circuitry 845 may comprise specially designed hardware (e.g., antennae) and/or software used to send information from the device 800 and/or receive information at the device 800. Communication circuitry 845 could be used, e.g., to communicate with one or more other electronic devices and/or one or more cloud servers, e.g., for the performance of various computational tasks or the receiving of desired information from one or more external sources.

Image capture circuitry 850 may comprise one or more camera units configured to capture images, e.g., images which may be processed to generate stylized versions of said captured images, e.g., in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An image processing method, comprising:
    obtaining a first image of a first scene at a first capture time;
    obtaining location information related to the first image;
    comparing the first image to a first plurality of images stored in an image database, wherein each of the first plurality of images is associated with location information and a capture time;
    identifying a first subset of images from the first plurality of images based, at least in part, on the respective location information of the first subset of images;
    selecting a second image from the first subset of images based, at least in part, on the second image's associated location information, wherein the second image depicts at least a part of the first scene, and wherein the capture time of the second image is different than the first capture time;
    identifying at least a first structural element and at least a first stylistic element characterizing the second image;
    extracting the at least first stylistic element from the second image, wherein the at least first stylistic element from the second image is based, at least in part, on the capture time of the second image; and
    applying the extracted at least first stylistic element to at least part of the first image to create a stylized version of the first image; and
    storing the stylized version of the first image in a memory.

2. The method of claim 1, further comprising:
    selecting a third image from the first subset of images based, at least in part, on the third image's associated location information, wherein the third image depicts at least a part of the first scene, and wherein the capture time of the third image is different than the first capture time;
    identifying at least a second structural element and at least a second stylistic element characterizing the third image;
    extracting the at least second stylistic element from the third image, wherein the at least second stylistic element from the third image is based, at least in part, on the capture time of the third image; and
    applying the extracted at least second stylistic element to at least part of the first image.

3. The method of claim 1, wherein the capture time of the second image being different than the first capture time comprises the second image being captured during at least one of the following: a different time of day than the first image; a different time of year than the first image; and a different season than the first image.

4. The method of claim 1, wherein extracting the at least first stylistic element from the second image further comprises:
    storing the at least first stylistic element as a plurality of layers in a neural network.

5. The method of claim 1, wherein applying the extracted at least first stylistic element to at least part of the first image further comprises:
    determining a first scene object that is present in each of the first image and the second image;
    generating a three-dimensional model of the first scene object in the first image; and applying the extracted at least first stylistic element to the generated three-dimensional model of the first scene object in the first image.

6. The method of claim 5, wherein applying the extracted at least first stylistic element to at least the first scene object in the first image further comprises:
   selecting one or more additional images from the first subset of images based, at least in part, on the one or more additional images' associated location information, wherein the capture times of the one or more additional images are different than the first capture time; and
   generating a second three-dimensional model of the first scene object based on the selected one or more additional images,
   wherein applying the extracted at least first stylistic element to the generated three-dimensional model of the first scene object in the first image is further based, at least in part, on the generated second three-dimensional model.

7. The method of claim 1, wherein the act of applying the extracted at least first stylistic element to at least part of the first image is further configured to penalize alterations to the at least first structural element.

8. The method of claim 1, wherein selecting the second image from the first subset of images further comprises:
   selecting a second image with associated location information that is within a distance similarity threshold of the location information related to the first image.

9. The method of claim 5, wherein the act of determining that the first scene object is present in each of the first image and the second image further comprises
   determining a point of view (POV) of the first scene object in each of the first and second images.

10. The method of claim 1, wherein the act of identifying a first subset of images from the first plurality of images is further based, at least in part, on the respective capture times of the first subset of images.

11. A non-transitory program storage device comprising instructions stored thereon to cause one or more processors to:
   obtain a first image of a first scene at a first capture time;
   obtain location information related to the first image;
   compare the first image to a first plurality of images stored in an image database, wherein each of the first plurality of images is associated with location information and a capture time;
   identify a first subset of images from the first plurality of images based, at least in part, on the respective location information of the first subset of images;
   select a second image from the first subset of images based, at least in part, on the second image's associated location information, wherein the second image depicts at least a part of the first scene, and wherein the capture time of the second image is different than the first capture time;
   determine a first scene object that is present in each of the first image and the second image;
   identify at least a first structural element and at least a first stylistic element characterizing the second image;
   extract the at least first stylistic element from the second image, wherein the at least first stylistic element from the second image is based, at least in part, on the capture time of the second image; and
   apply the extracted at least first stylistic element to at least the part of the first image to create a stylized version of the first image; and
   store the stylized version of the first image in a memory.

12. The non-transitory program storage device of claim 11, wherein the capture time of the second image being different than the first capture time comprises the second image being captured during at least one of the following: a different time of day than the first image; a different time of year than the first image; and a different season than the first image.

13. The non-transitory program storage device of claim 11, wherein the instructions to extract the at least first stylistic element from the second image further comprise instructions to:
   store the at least first stylistic element as a plurality of layers in a neural network.

14. The non-transitory program storage device of claim 11, wherein the instructions to apply the extracted at least first stylistic element to at least part of the first image further comprise instructions to:
   determine a first scene object that is present in each of the first image and the second image;
   generate a three-dimensional model of the first scene object in the first image; and
   apply the extracted at least first stylistic element to the generated three-dimensional model of the first scene object in the first image.

15. The non-transitory program storage device of claim 11, wherein the instructions to select the second image from the first subset of images further comprise instructions to:
   select a second image with associated location information that is within a distance similarity threshold of the location information related to the first image.

16. A device, comprising:
   a memory;
   one or more camera units;
   a display;
   a user interface; and
   one or more processors operatively coupled to the memory, wherein the one or more processors are configured to execute instructions causing the one or more processors to:
      obtain, from the one or more camera units, a first image of a first scene at a first capture time;
      obtain location information related to the first image;
      compare the first image to a first plurality of images stored in an image database, wherein each of the first plurality of images is associated with location information and a capture time;
      identify a first subset of images from the first plurality of images based, at least in part, on the respective location information of the first subset of images;
      select a second image from the first subset of images based, at least in part, on the second image's associated location information, wherein the second image depicts at least a part of the first scene, and wherein the capture time of the second image is different than the first capture time;
      identify at least a first structural element and at least a first stylistic element characterizing the second image;
      extract the at least first stylistic element from the second image, wherein the at least first stylistic element from the second image is based, at least in part, on the capture time of the second image; and
      apply the extracted at least first stylistic element to at least part of the first image to create a stylized version of the first image; and store the stylized version of the first image in the memory.

17. The device of claim 16, wherein the capture time of the second image being different than the first capture time comprises the second image being captured during at least one of the following: a different time of day than the first image; a different time of year than the first image; and a different season than the first image.

18. The device of claim 16, wherein the instructions to extract the at least first stylistic element from the second image further comprise instructions to:
   store the at least first stylistic element as a plurality of layers in a neural network.

19. The device of claim 16, wherein the instructions to apply the extracted at least first stylistic element to at least part of the first image further comprise instructions to:
   determine a first scene object that is present in each of the first image and the second image;
   generate a three-dimensional model of the first scene object in the first image; and
   apply the extracted at least first stylistic element to the generated three-dimensional model of the first scene object in the first image.

20. The device of claim 16, wherein the instructions to select the second image from the first subset of images further comprise instructions to:
   select a second image with associated location information that is within a distance similarity threshold of the location information related to the first image.

* * * * *